(12) United States Patent
Li et al.

(10) Patent No.: US 12,066,643 B2
(45) Date of Patent: Aug. 20, 2024

(54) ELECTROMAGNETIC ABSORPTION METAMATERIAL

(71) Applicant: Shanghai Institute of Microsystem and Information Technology, Chinese Academy of Sciences, Shanghai (CN)

(72) Inventors: Tie Li, Shanghai (CN); Aisheng Yu, Shanghai (CN); Wei Li, Shanghai (CN); Yuelin Wang, Shanghai (CN)

(73) Assignee: Shanghai Institute of Microsystem and Information Technology, Chinese Academy of Sciences, Shanghai (CN)

( * ) Notice: Subject to any disclaimer, the term of this patent is extended or adjusted under 35 U.S.C. 154(b) by 1142 days.

(21) Appl. No.: 16/638,070

(22) PCT Filed: May 14, 2018

(86) PCT No.: PCT/CN2018/086649
§ 371 (c)(1),
(2) Date: Feb. 10, 2020

(87) PCT Pub. No.: WO2019/029207
PCT Pub. Date: Feb. 14, 2019

(65) Prior Publication Data
US 2020/0174166 A1    Jun. 4, 2020

(30) Foreign Application Priority Data

Aug. 11, 2017   (CN) .......................... 201710685056.9
Aug. 11, 2017   (CN) .......................... 201721007696.6

(51) Int. Cl.
*G02B 5/00*       (2006.01)
*G02B 1/00*       (2006.01)

(52) U.S. Cl.
CPC .............. *G02B 5/003* (2013.01); *G02B 1/002* (2013.01)

(58) Field of Classification Search
CPC .......... G02B 5/003; G02B 1/002; G02B 1/00; G02B 5/00; H01Q 15/00; H01Q 17/00
See application file for complete search history.

(56) References Cited

U.S. PATENT DOCUMENTS 6,897,820 B2 *   5/2005   Frenkel .............. H01Q 15/0013
                                                    343/756
8,106,850 B1 *   1/2012   Gregoire .............. H01Q 15/002
                                                    343/909

(Continued)

FOREIGN PATENT DOCUMENTS

CN           107453052         12/2017

OTHER PUBLICATIONS

Fu, Szeming et al. "Non-Reciprocal Meta-Surfaces for Nanophtonic Light Trapping: Optical Isolators versus Solar Cells"; 2015 IEEE 42nd Photovoltaic Specialist Conference (PVSC), Jun. 19, 2015 (Jun. 19, 2015), 4 pages.

(Continued)

*Primary Examiner* — Balram T Parbadia
(74) *Attorney, Agent, or Firm* — Boyle Fredrickson, S.C.

(57) ABSTRACT

An electromagnetic absorption metamaterial having an upper surface in a working environment, comprising a periodic resonant unit array. The metamaterial is provided with a dielectric composite film on the upper surface and the film is obtained by laminating solid dielectric layers in different thickness proportions. Materials of said dielectric composite film are selected from at least two materials of silicon oxide, silicon nitride, aluminum oxide, magnesium fluoride and silicon. By selecting different types of dielectric films and laminating the dielectric films in certain proportions, the metamaterial of the present application can obtain a dielectric film having a refractive index between the maximum and minimum refractive index in selected media, thereby achieving more flexible and controllable modulation (Continued)

of surface lattice resonance. The dielectric composite film is obtained by laminating solid dielectric layers in different thickness proportions, and therefore can work in almost any working environment, even in liquid or moving environments.

11 Claims, 2 Drawing Sheets

(56) References Cited

U.S. PATENT DOCUMENTS

| | | | | |
|---|---|---|---|---|
| 10,725,208 | B2* | 7/2020 | Alvine | E06B 9/24 |
| 2013/0112876 | A1* | 5/2013 | Nam | G01J 5/046 |
| | | | | 250/338.1 |
| 2013/0314765 | A1* | 11/2013 | Padilla | G02F 1/133377 |
| | | | | 428/209 |
| 2014/0166103 | A1* | 6/2014 | Kempa | H01L 31/02168 |
| | | | | 438/98 |
| 2014/0246749 | A1* | 9/2014 | Nam | G01J 5/12 |
| | | | | 257/467 |
| 2015/0285953 | A1* | 10/2015 | Naik | G02B 5/008 |
| | | | | 977/761 |
| 2015/0340521 | A1* | 11/2015 | Kempa | H01L 31/022433 |
| | | | | 438/71 |
| 2017/0199425 | A1* | 7/2017 | Nam | G02F 1/23 |
| 2017/0338567 | A1* | 11/2017 | Puscasu | G01J 5/024 |
| 2018/0245772 | A1* | 8/2018 | Tomita | F21K 9/64 |
| 2019/0339418 | A1* | 11/2019 | Sirbuly | C23C 16/45525 |
| 2019/0391301 | A1* | 12/2019 | Takatori | G02B 5/008 |

OTHER PUBLICATIONS

Yu, Aisheng et al. "Mid-Infrared Bandwidth Reduction of LSPR by Rayleigh Anomalies"; Proceedings of the 12th IEEE International Conference on Nano/Micro Engineered and Molecular Systems, Apr. 12, 2017 (Apr. 12, 2017).

* cited by examiner

ELECTROMAGNETIC ABSORPTION METAMATERIAL

CROSS REFERENCE TO RELATED APPLICATIONS

This application is a Section 371 U.S. National Phase Entry of International Patent Application No. PCT/CN2018/086649, filed on May 14, 2018, the contents of which are all hereby incorporated by reference. This application also claims the priority of Chinese Patent Application No. 201721007696.6 and CN201710685056.9, both of which were filed on Aug. 11, 2017, the entirety of which are hereby incorporated by reference.

FIELD OF THE INVENTION

The present application relates to the field of electromagnetic absorption metamaterials, in particular to a metamaterial with an array-arrangement of resonant units based on metal localized surface plasma resonance.

BACKGROUND OF THE INVENTION

Electromagnetic absorption metamaterials are generally made up of resonant units arranged in array according to their absorption characteristics. From visible band to middle-infrared band, resonant units can be made up of metal particles. This resonant unit mainly uses the localized surface plasmon resonance (LSPR) of metal particles, which is also known as dipole resonance, whose resonance frequency can be conveniently controlled by the size of metal particles. The location of LSPR peak is:

$$\lambda_{LSPR} = \frac{\pi D^*}{1.841} n_d \left(1 + \frac{2c}{\omega_p d}\right)^{\frac{1}{2}} \quad (1)$$

Wherein, $D^*$ is the effective size of particles; $n_d$ is the refractive index of working environment; and $\omega_p$ is the frequency of the metal plasma.

However, in these electromagnetic absorption metamaterials based on metal particles or metal resonance rings, the resonance has a large resonance damping due to the inherent losses of metal, resulting in a large full width at half maximum of the LSPR peak, which severely limits the application of electromagnetic absorption metamaterials in the narrow band field.

In 2004, Shengli Zou et al. from Northwestern University USA proved theoretically that: a collective resonance peak with a full width at half maximum 1 or 2 magnitudes less than a LSPR resonance peak exists in these periodically arranged resonant units, which is highly correlated with array periodicity and is known as surface lattice resonance (SLR). They confirmed the existence of the resonance peak in experiments the following year.

The SLR location can be estimated by the location of Rayleigh abnormal (RA). The location of the SLR peak generally appears near RA, but it is not completely consistent with RA. The location where RA appears:

$$\lambda_{RA} = \frac{n}{\sqrt{\frac{i^2}{P_x^2} + \frac{j^2}{P_y^2}}} \quad (2)$$

Wherein, n is the refractive index of the working environment; i and j are integers which indicate different diffraction orders; Px and Py are array periods in different directions. Similar to Rayleigh abnormal, the SLR location strongly depends on the array period and the refractive index of the working environment. In addition, it also has the characteristics of angular dispersion, that is, the SLR location is related to the angle of the light source or the detection angle.

SLR has an extremely low full width at half maximum, which is usually as low as a few nanometers to tens of nanometers and can be used in narrow-band application scenarios, such as narrow-band infrared detectors. In addition, SLR can also be coupled to LSPR so that the two peaks overlap to adjust the resonance peak shape of the LSPR, such as to obtain an asymmetric Fano resonance line shape (distinguished from the symmetric lorentz line shape). Or, it can further reduce full width at half maximum of LSPR while keeping all of the advantages of LSPR. For example, in 2008, Yizhuo Chu et al. from Harvard University produced two-dimensional arrays of gold particles on ITO materials, and designed different array periods to move SLR slowly to the location of the LSPR, coupling SLR with LSPR, thus reducing full width at half maximum of the integrated resonance peak to 26.6 nm. By contrast, full width at half maximum of LSPR for the sample which did not use SLR coupling was 311.6 nm.

At present, there is no narrow-band light source or narrow-band absorbing device which is realized by directly using SLR spectral characteristics in the far field, so narrow-band light sources and narrow-band absorbing devices are still in the research stage. The main problem encountered in the far field application of SLR is the current need for an even medium environment and a highly consistent period by SLR observation. Wherein, the medium environment refers to the environments attached to the upper and lower surfaces of resonant units of the device (instead of a working environment). Different refractive indexes of the environments attached to the upper and lower surfaces of resonant units may lead to a very weak intensity of the SLR resonance peak and broadening being increased. The intensity of the SLR resonance peak is also easy to be affected by array consistency. Both inconsistent array periods and inconsistent resonant units may lead to the same problem. All of those limit the practical application of SLR in far-field optics.

In order to ensure the evenness of the medium environment, the above-mentioned work by Yizhuo Chu et al. used high-precision electron beam lithography, and at the same time, used "water" on the upper surface of the array to obtain a relatively even medium environment. In addition, in 2010, Ronen Adato et al. proposed a structure embedded with resonant units, that is, first dig grooves on substrates, and then make the resonant units which were embedded in the substrates in the groove. Thus it could be seen that the upper and lower surfaces of resonant units were all in the substrates which was an even medium environment in order to realize a relatively even medium environment.

However, the introduction of high-precision electron beam lithography technology or manufacturing of grooves significantly increases the difficulty of device processing, which undoubtedly increases the cost of manufacturing and limits the application of SLR. In addition, a liquid matching layer can also be added to the upper surface of the resonant unit structure to realize SLR observation. In 2013, Andrey G. Nikitin et al. found that SLR could be observed in uneven medium environments on the upper and lower surfaces of resonant units. They made resonant units on glass substrates (n=1.5) and compared the conditions that three liquid layers of glycerin (n=1.47), water (n=1.33) and air (n=1) are used as the upper surfaces respectively. The results showed that the influence of SLR on LSPR was still observed in the medium uneven environment (such as water and air) on the upper and lower surfaces of resonant units. However, since SLR is a kind of lattice surface resonance, it is easy for the location of its resonance peak to be affected by the thickness of liquid matching layers when using liquid matching layers. In practice, SLR intensity is weak when the evenness of liquid matching layers is poor, and the thickness and evenness of liquid matching layers is difficult to control, which leads to the SLR location being uncertain. In addition, liquid matching layers do not work if the devices are operating in liquid or moving working environments.

In 2016, SEYED M. SADEGHI et al. found that SLR intensity could also be effectively enhanced by using Si (silicon) films with a thickness of tens of nanometers in near-infrared bands. This method does not need to use a very thick liquid layer (or liquid+medium block), but to add a dielectric film directly without letting refractive index of the medium covered above the array be close to that of the medium below, so as to achieve the effect of similarity between the refractive indexes of the media on the upper and lower side of the array, and thus it is no longer necessary for refractive indexes to be matched. However, due to the limited modulation capability of using silicon film, this method may not achieve the desired effect in different working environments, for example, when the refractive index of the working environment of the device is much higher than that of silicon.

SUMMARY OF THE INVENTION

The purpose according to the present application is to provide an electromagnetic absorption metamaterial so as to flexibly modulate its surface lattice resonance (SLR) and enhance its adaptability to the working environment.

Thus the present application is provided with an electromagnetic absorption metamaterial having an upper surface in a working environment, comprising a periodic resonant-unit array, the electromagnetic absorption metamaterial is provided with a layer of dielectric composite film on the upper surface and the film is obtained by laminating solid dielectric layers of different materials in different thickness proportions.

According to an embodiment of the present application, materials of the dielectric composite film are at least two materials selected from the group consisting of silicon oxide, silicon nitride, aluminum oxide, magnesium fluoride and silicon.

According to an embodiment of the present application, the dielectric composite film is deposited on a surface of the electromagnetic absorption metamaterial by semiconductor technology, and the semiconductor technology comprises CVD, PVD and ALD.

According to an embodiment of the present application, the dielectric composite film applies a modulation to surface lattice resonance location and surface lattice resonance intensity of the electromagnetic absorption metamaterial.

According to an embodiment of the present application, the modulation of the dielectric composite film to the surface lattice resonance intensity of the electromagnetic absorption metamaterial comprises moving the location of the surface lattice resonance towards shorter wavelengths or weakening the surface lattice resonance intensity, when an equivalent refractive index of the dielectric composite film is set to be less than that of the working environment.

According to an embodiment of the present application, the modulation of the dielectric composite film to the surface lattice resonance intensity of the electromagnetic absorption metamaterial comprises moving the location of the surface lattice resonance towards longer wavelengths or enhancing the surface lattice resonance intensity, when an equivalent refractive index of the dielectric composite film is set to be more than that of the working environment.

According to an embodiment of the present application, the equivalent refractive index $n_{\mathit{eff}}$ of the dielectric composite film is:

$$n_{\mathit{eff}} = \sum_{i=N} \frac{n_i h_i}{h},$$

wherein, N is a number of layers of the dielectric composite film, $n_i$ is a refractive index of an i-th layer dielectric, $h_i$ is a thickness of an i-th layer dielectric, and h is a total thickness of the dielectric composite film.

According to an embodiment of the present application, a film thickness of the dielectric composite film or difference between the equivalent refractive index of the dielectric composite film and that of the working environment is proportional to a modulation effect and is inversely proportional to a film thickness required to achieve a same modulation effect.

According to an embodiment of the present application, resonant units of the periodic resonant-unit array are based on LSPR or LC resonance.

According to an embodiment of the present application, the dielectric composite film is produced by CVD, PVD or ALD of the semiconductor technology.

According to the electromagnetic absorption metamaterial provided by the present application, by selecting different types of dielectric films and laminating them in certain proportions, a dielectric film having a refractive index between the maximum refractive index and the minimum refractive index of selected media can be obtained, thereby implementing more flexible and controllable modulation of SLR by changing the thickness of the film and the difference between the equivalent refractive index of the dielectric composite film and the refractive index of the working environment. A surface dielectric composite film is used to enhance or modulate SLR of the metamaterial instead of existing liquid matching layer so as to avoid the problem of index matching of the liquid matching layer. The dielectric composite film is obtained by laminating solid dielectric layers in different thickness proportions, and therefore can almost work in any working environment, or even a liquid or moving environment. In addition, the thickness of the dielectric composite film is hundreds of nanometers, which can be easily deposited by semiconductor technology and is easy to produce.

BRIEF DESCRIPTION OF THE DRAWINGS

These and other features and advantages of this application will become more apparent to those skilled in the art from the detailed description of preferred embodiment. The drawings that accompany the description are described below. Wherein.

REFERENCE NUMBERS

1—normal substrate; 21—metal thin; 22—intermediate isolation medium layer; 23—periodic resonant-unit array; 3—dielectric composite film; 101—transparent substrate.

DESCRIPTION OF THE PREFERRED EMBODIMENTS

The followings are used to further illustrate the present application with specific embodiments. It should be understood that the following embodiments is only used to explain the present application but not to limit the scope of the present application.

Figure 1:
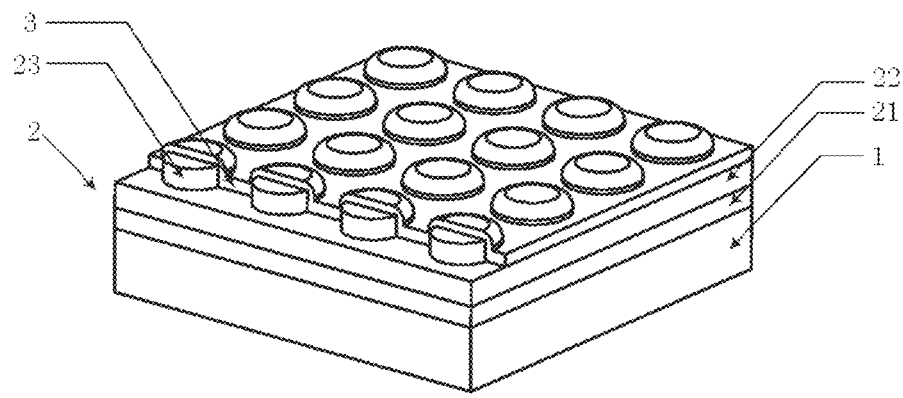
FIG. 1 shows a structure schematic drawing of the electromagnetic absorption metamaterial with a dielectric composite film according to an embodiment of the present application.
Figure 2:
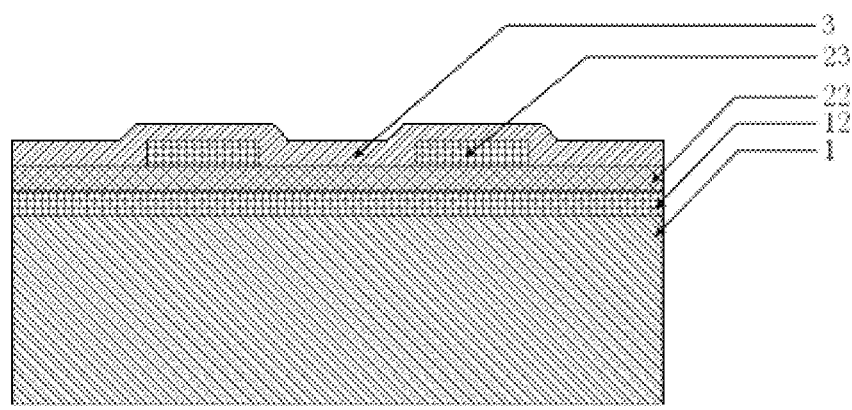
FIG. 2 shows a sectional view of the electromagnetic absorption metamaterial as shown in FIG. 1.

FIG. 1 and FIG. 2 show an electromagnetic absorption metamaterial according to an embodiment of the present application. The metamaterial is a kind of light-proof metamaterial 2 which is arranged on a substrate 1 and made of metal-dielectric-metal three-layer material, specifically comprising a continuous metal film 21, a continuous intermediate isolation dielectric layer 22 and a periodic resonant-unit array 23 laminated from bottom to top. The upper surface of the metamaterial 2 is in a working environment, and the upper surface of the metamaterial 2 is attached with a dielectric composite film 3 for modulating the surface lattice resonance (SLR) of the metamaterial.

The resonant unit is a metal resonant unit based on a localized surface plasmon resonance (LSPR). The dielectric composite film 3 is obtained by laminating solid dielectric layers in different materials, such as silicon oxide, silicon nitride, aluminum oxide, magnesium fluoride or silicon, and in different thickness proportions. The dielectric composite film 3 is a composite of various materials, for example, 100 nm silicon oxide+100 nm silicon nitride, or 150 nm silicon oxide+50 nm silicon nitride, or even 50 nm silicon oxide+50 nm silicon nitride+50 nm aluminum oxide, etc. Because of its various combination forms and various thickness proportions, here it is called dielectric composite film. The dielectric composite film 3 is deposited on the surface of metamaterial by chemical vapor deposition (CVD), physical vapor deposition (PVD) or atomic layer deposition (ALD) of the semiconductor technology. The total thickness of the dielectric composite film 3 having been studied at present is between 100 nm and 400 nm, which can be easily deposited by semiconductor technology and is easy to produce.

The equivalent refractive index $n_{eff}$ of the dielectric composite film 3 can be calculated by the following formula:

$$n_{eff} = \sum_{i=N} \frac{n_i h_i}{H} \qquad (3)$$

Wherein, N is the number of layers of the dielectric composite film 3, $n_i$ is the refractive index of the i-th solid dielectric layer, $h_i$ is the thickness of the i-th solid dielectric layer, and h is the total thickness of dielectric composite film 3. Therefore, if the extinction characteristics of materials are ignored, the refractive index of the material with the highest refractive index is high-n, and the refractive index of material with the lowest refractive index is low-n. The equivalent refractive index $n_{eff}$ of the dielectric composite film 3 will be linearly controlled and be linearly adjusted between high-n and low-n by controlling the thickness proportions of film layers in different materials in the dielectric composite film 3, to meet the need of different working environments. By selecting different types of dielectric films and laminating the dielectric films in certain proportions, a dielectric film having a refractive index between the maximum refractive index and the minimum refractive index of selected media can be obtained.

In the application, the equivalent refractive index $n_{eff}$ of the dielectric composite film 3 has a modulation on the SLR, which comprises the modulation of SLR position and the modulation of SLR intensity.

Figure 4:
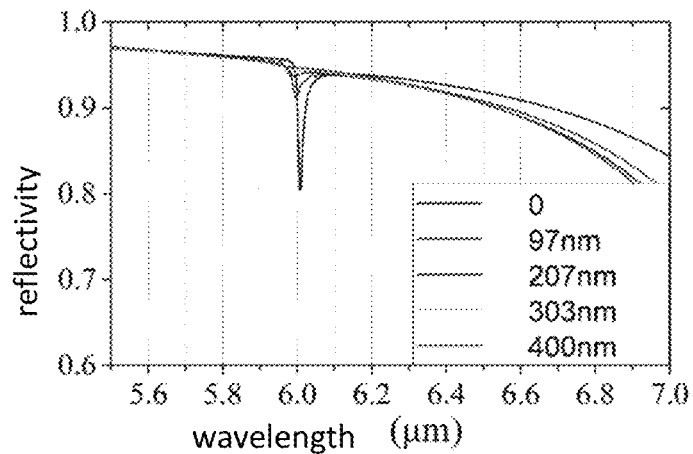
FIG. 4 shows a reflection spectrum of the electromagnetic absorption metamaterials as shown in FIG. 1 with different thicknesses of their dielectric composite films, wherein the equivalent refractive indexes of the dielectric composite films are 1.
Figure 5:
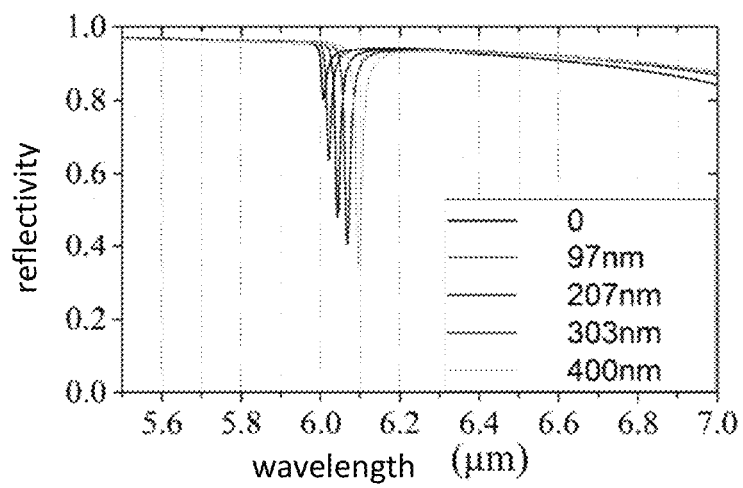
FIG. 5 shows another reflection spectrum of the electromagnetic absorption metamaterials as shown in FIG. 1 with different thicknesses of their dielectric composite films, wherein the equivalent refractive indexes of the dielectric composite films are 1.4.
Figure 6:
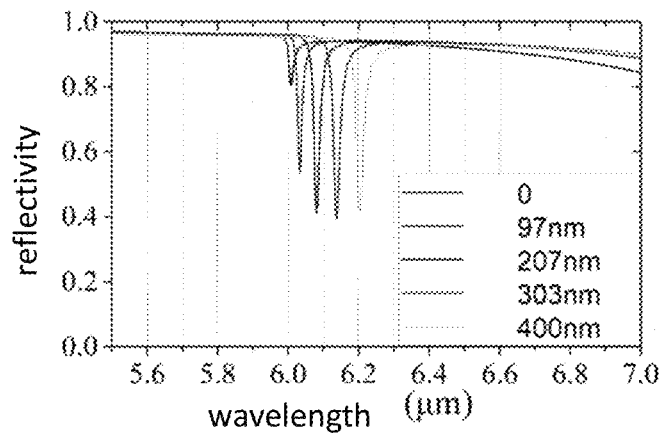
FIG. 6 shows another reflection spectrum of the electromagnetic absorption metamaterials as shown in FIG. 1 with different thicknesses of their dielectric composite films, wherein the equivalent refractive indexes of the dielectric composite films are 1.6.

FIGS. 4-6 show the simulation results of the reflection spectrums of the electromagnetic absorption metamaterials as shown in FIG. 1 with different thicknesses of their dielectric composite films 3. The simulation results are simulated using FDTD software. Wherein, the metal films 21 used in FIGS. 4-6 are uniform gold films with a thickness of 100 nm, resulting in their thicknesses greater than their skin depths and no transmission, so the substrate materials are not considered. The user-defined material thicknesses of the intermediate isolation medium layers 22 are 180 nm, the real parts of their refractive indexes are 1.2, and their extinction coefficients are zero. The resonant units of the periodic resonant-unit array 23 are cylinders with radius of 1.5 m and height of 100 nm, made of gold and arranged in square arrays with an array periodicity of 5 μm in both directions. It is assumed in FIGS. 4-6 that the refractive index of the working environment is 1.2, that is, the entire device and light source are in a working environment having a refractive index of 1.2. In the simulation, a layer of user-defined dielectric film is used to represent the dielectric composite film 3, the refractive indexes real parts n of the films are 1, 1.4 and 1.6 respectively, ignoring extinction coefficients k. Different curves in each figure represent films of different thicknesses. For example, "97 nm" in FIG. 4 means that the dielectric composite film 3 in FIG. 2 is a user-defined film with a thickness of 97 nm, a refractive index n=1 and an extinction coefficient k=0.

The reflection valleys shown in FIGS. 4, 5, and 6 are the locations of SLR. As can be seen from FIGS. 4-6, if the equivalent refractive index $n_{eff}$ of the dielectric composite film 3 is less than that of the working environment, then the SLR location of the metamaterial with the dielectric composite film 3 will move towards shorter wavelengths and its SLR intensity will decrease compared with the metamaterial without the dielectric composite film 3. On the contrary, if the equivalent refractive index $n_{eff}$ of dielectric composite film 3 is greater than that of the working environment, then the SLR location of the metamaterial with the dielectric composite film 3 will move towards longer wavelengths and its SLR intensity will increase compared with the metamaterial without the dielectric composite film 3. In addition, with other conditions unchanged, by controlling the film thickness and the difference between the equivalent refractive index of the dielectric composite film 3 and the refractive index of the working environment, modulation of different intensities can be realized, that is, flexible and controllable modulation of SLR location and intensity can be realized, The greater the film thickness or the difference between the equivalent refractive index of the dielectric composite film 3 and the refractive index of the working environment, the more obvious the modulation effect. The larger the difference between the refractive index of the composite film and that of the operating environment, the lower the film thickness required to achieve the same modulation effect. In other words, the thickness of the dielectric composite film or the difference between the equivalent refractive index of the dielectric composite film and that of the working environment is proportional to the modulation effect and is inversely proportional to the film thickness required to achieve the same modulation effect.

Figure 3:
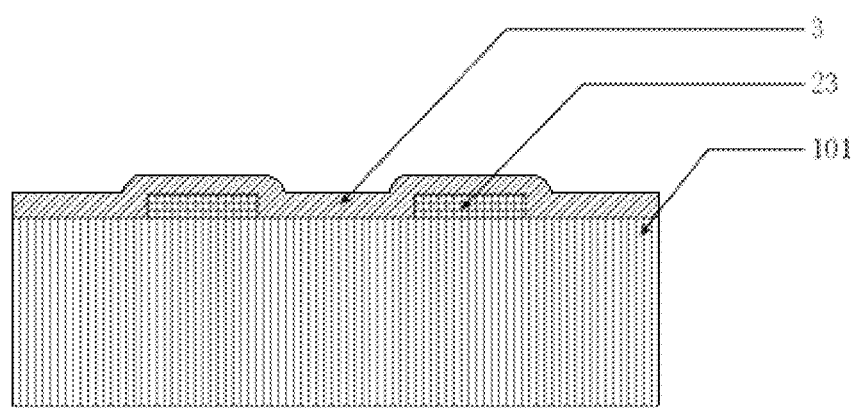
FIG. 3 shows a sectional view of the electromagnetic absorption metamaterial with a dielectric composite film according to another embodiment of the present application.

According to another embodiment of the present invention, as shown in FIG. 3, the metamaterial 2 may also be a light-transparent electromagnetic absorption metamaterial arranged on a light-transparent substrate 101, and specifically comprises a periodic resonant-unit array 23. Its resonance units are based on localized surface plasmon resonance (LSPR). In addition, the metamaterial 2 may be other metamaterial having an array of periodic resonant-units, the resonance units thereof may be based on LSPR or LC resonance.

The foregoing application has been described in accordance with the relevant legal standard, thus the description is exemplary rather than limiting in nature. Variations and modifications to the disclosed embodiment may become apparent to those skilled in the art and do come within the scope of the application. Accordingly, the scope of legal protection afforded this application can only be determined by studying the following claims.

What is claimed is:

1. An electromagnetic absorption metamaterial having an upper surface in a working environment, the electromagnetic absorption metamaterial comprising: a periodic resonant-unit array, wherein the electromagnetic absorption metamaterial is provided with a layer of dielectric composite film attached to an upper surface of the periodic resonant-array unit array; wherein the dielectric composite film is continuous to provide an even medium environment attached to the upper surface of the periodic resonant-unit array; and said dielectric composite film applies a modulation to surface lattice resonance location and surface lattice resonance intensity of said electromagnetic absorption metamaterial; and the dielectric composite film is obtained by laminating solid dielectric layers of different materials in different thickness proportions, so that the electromagnetic absorption metamaterial can work in any working environment.

2. The electromagnetic absorption metamaterial according to claim 1, wherein the material of said dielectric composite film is made of at least two materials selected from the group consisting of silicon oxide, silicon nitride, aluminum oxide, magnesium fluoride and silicon.

3. The electromagnetic absorption metamaterial according to claim 1, wherein said dielectric composite film is deposited on a surface of said electromagnetic absorption metamaterial by semiconductor technology.

4. The electromagnetic absorption metamaterial according to claim 3, wherein said semiconductor technology comprises CVD, PVD or ALD.

5. The electromagnetic absorption metamaterial according to claim 1, wherein said modulation comprises moving the location of the surface lattice resonance towards a shorter wavelength or weakening the surface lattice resonance intensity when an equivalent refractive index of said dielectric composite film is set to be less than that of said working environment.

6. The electromagnetic absorption metamaterial according to claim 5, wherein said equivalent refractive index $n_{eff}$ of said dielectric composite film is:

$$n_{eff} = \sum_{i=N} \frac{n_i h_i}{h},$$

wherein, N is a number of layers of said dielectric composite film, $n_i$ is a refractive index of an i-th layer dielectric, $h_i$ is a thickness of an i-th layer dielectric, and h is a total thickness of said dielectric composite film.

7. The electromagnetic absorption metamaterial according to claim 5, wherein the film thickness of said dielectric composite film or difference between said equivalent refractive index of said dielectric composite film and that of said working environment is proportional to a modulation effect, and is inversely proportional to a film thickness required to achieve a same modulation effect.

8. The electromagnetic absorption metamaterial according to claim 1, wherein said modulation comprises moving the location of the surface lattice resonance towards a longer wavelength or enhancing the surface lattice resonance intensity when an equivalent refractive index of said dielectric composite film is set to be more than that of said working environment.

9. The electromagnetic absorption metamaterial according to claim 8, wherein said equivalent refractive index $n_{eff}$ of said dielectric composite film is:

$$n_{eff} = \sum_{i=N} \frac{n_i h_i}{h},$$

wherein, N is a number of layers of said dielectric composite film, $n_i$ is a refractive index of an i-th layer dielectric, $h_i$ is a thickness of an i-th layer dielectric, and h is a total thickness of said dielectric composite film.

10. The electromagnetic absorption metamaterial according to claim 8, wherein the film thickness of said dielectric composite film or difference between said equivalent refractive index of said dielectric composite film and that of said working environment is proportional to a modulation effect, and is inversely proportional to a film thickness required to achieve a same modulation effect.

11. The electromagnetic absorption metamaterial according to claim 1, wherein said resonant units of said periodic resonant-unit array are based on LSPR or LC resonance.

* * * * *